No. 642,993. Patented Feb. 6, 1900.
B. E. L. DE MARÉ.
OPTICAL PROJECTING APPARATUS.
(Application filed May 7, 1894.)
(No Model.) 2 Sheets—Sheet 1.
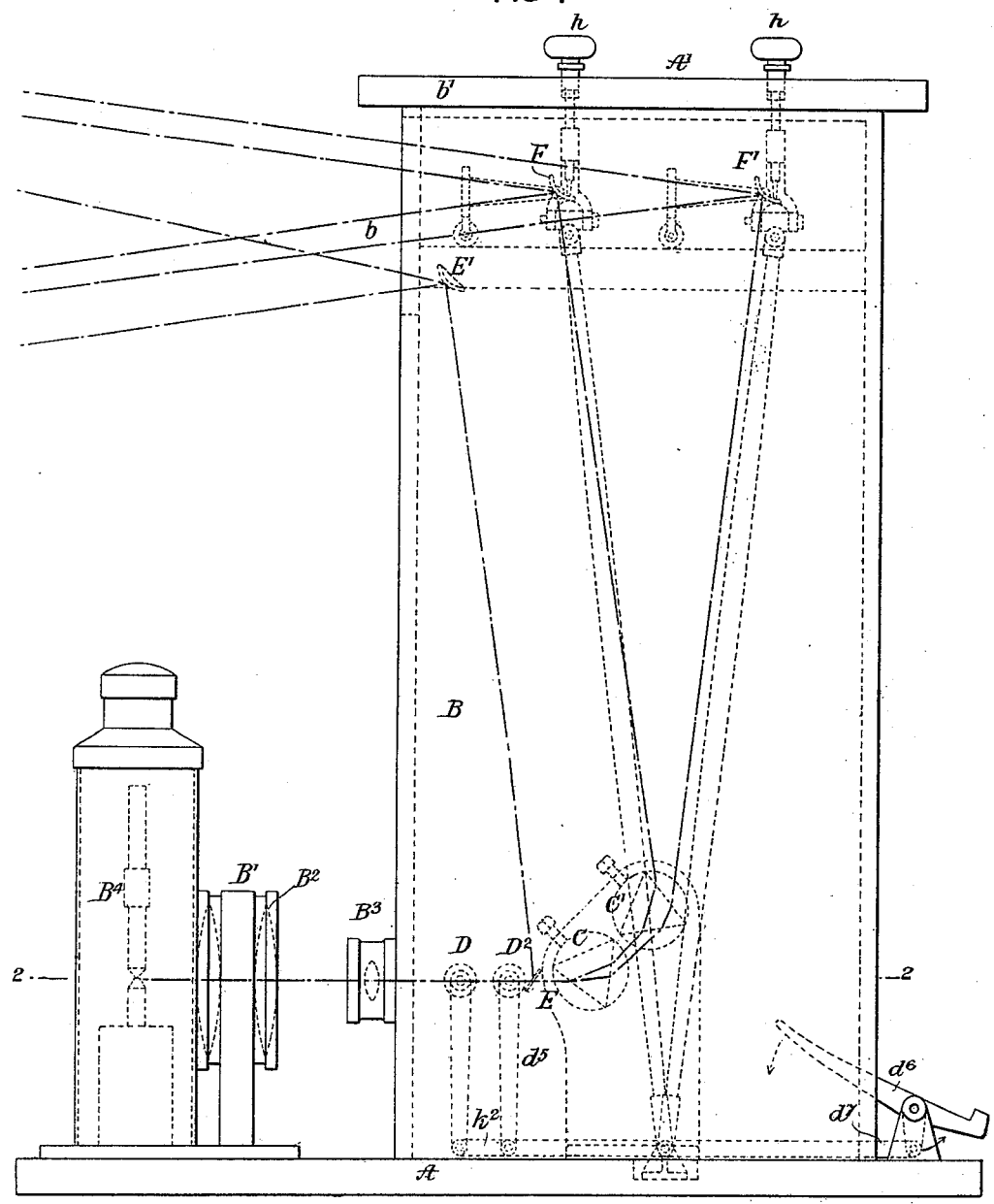
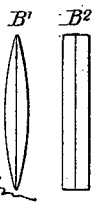
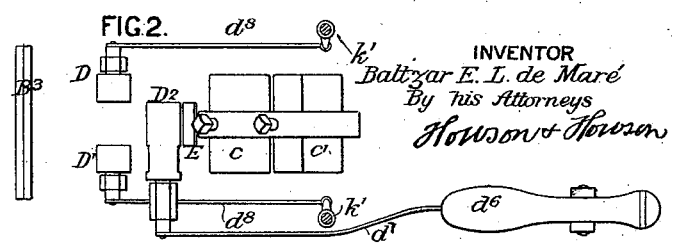
WITNESSES
William A. Barr.
F. D. Goodwin
INVENTOR
Baltzar E. L. de Maré
By his Attorneys
Howson & Howson No. 642,993. Patented Feb. 6, 1900.
B. E. L. DE MARÉ.
OPTICAL PROJECTING APPARATUS.
(Application filed May 7, 1894.)
(No Model.) 2 Sheets—Sheet 2.
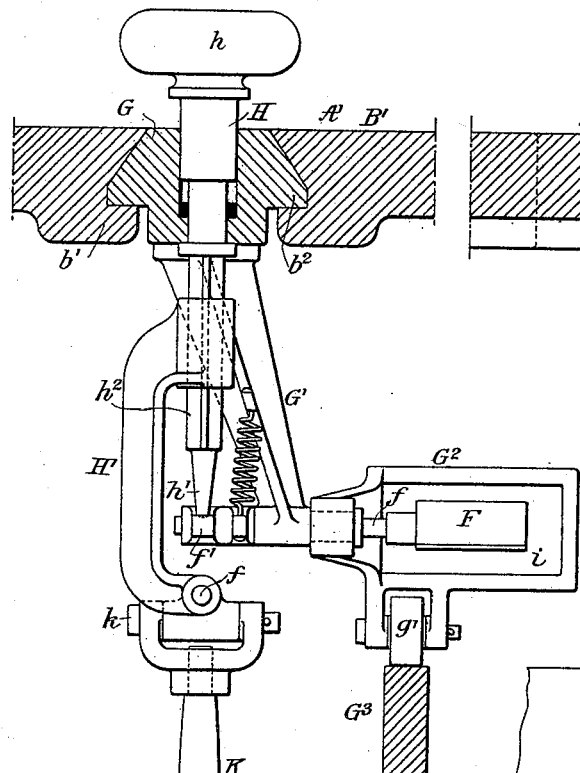
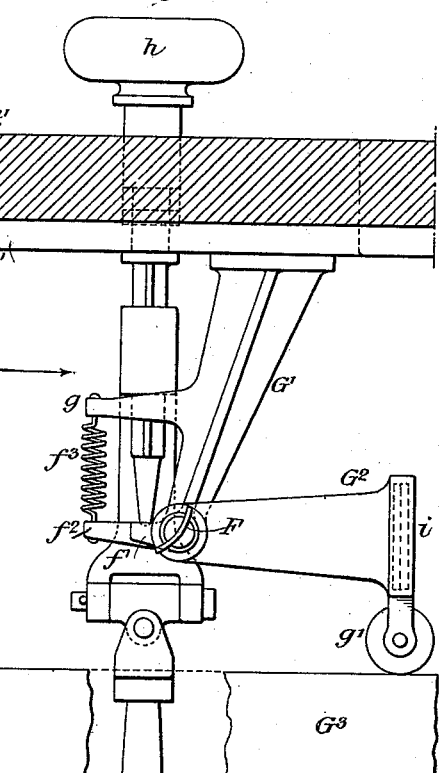
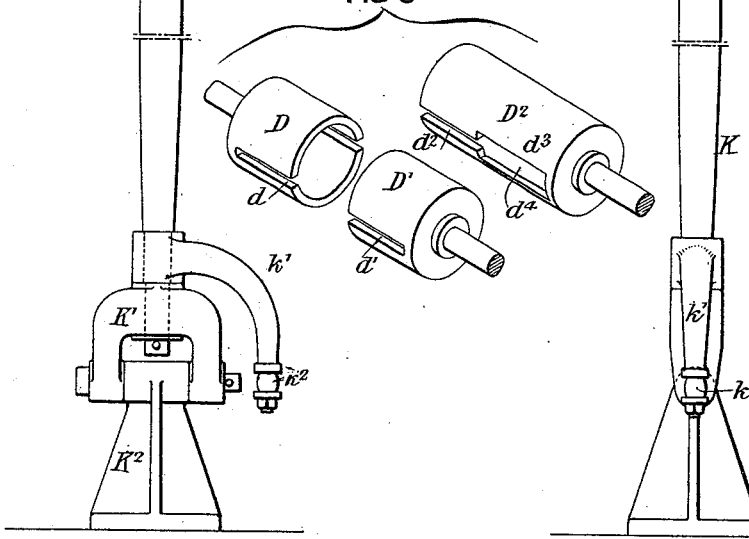
WITNESSES
William N. Bass.
F. D. Goodwin
INVENTOR
Baltzar E. L. de Maré
By his Attorneys
Howson & Howson

UNITED STATES PATENT OFFICE.

BALTZAR E. L. DE MARÉ, OF PHILADELPHIA, PENNSYLVANIA.

OPTICAL PROJECTING APPARATUS.

SPECIFICATION forming part of Letters Patent No. 642,993, dated February 6, 1900.

Application filed May 7, 1894. Serial No. 510,322. (No model.)

*To all whom it may concern:*

Be it known that I, BALTZAR E. L. DE MARÉ, a subject of the King of Sweden and Norway, and a resident of Philadelphia, Pennsylvania, have invented a certain Process of and Apparatus for Projecting Colored Lights, of which the following is a specification.

The object of my invention is to construct an apparatus for effecting illumination in colors, the apparatus being especially adapted to projecting colored lights on the stage, although it will be understood that my invention can be used for other purposes as well—as, for instance, in making signals between ships or between maneuvering army corps at night.

In the accompanying drawings, Figure 1 is a view in elevation of my improved apparatus. Fig. 2 is a sectional plan on the line 2 2, Fig. 1. Fig. 3 is an enlarged view of a portion of the apparatus, showing the shifting mechanism. Fig. 4 is a view looking in the direction of the arrow, Fig. 3. Fig. 5 is a detached perspective view of the shutters.

A is the base of the apparatus, and mounted on this base in the present instance is a light $B^4$, preferably of an electric-arc lamp.

$B'$ is a collimating lens so adjusted that the rays passing through it issue parallel to one another.

$B^2$ is a cylindrical convex lens from which the rays issue converging in the vertical plane, but still parallel in the horizontal plane.

$B^3$ is a lens similar to $B^2$, though narrower, by which the rays from lens $B^2$ are again refracted, so as to issue parallel to one another in both planes, thus forming a thin, but wide, ribbon of light, said lens $B^3$ being preferably mounted on the frame or box B. Within this box are the shutters D $D'$ $D^2$, so arranged that when they are manipulated they can vary the thickness or entirely cut out that portion of the thin ribbon of light which comes within their limits. For instance, the central shutter $D^2$ can be manipulated so as to regulate the central portion of the ribbon of light, the shutter D being adapted to regulate a portion at one side of the center and the shutter $D'$ a portion on the opposite side of the center.

Directly back of the central shutter $D^2$ is a plane mirror E, so arranged as to reflect the central rays of light to the spherical convex mirror $E'$ in the upper portion of the box B, said mirror $E'$ reflecting the light out through the opening $b$ in the front of the box.

The shutter $D^2$ is, as shown in Fig. 5, made in the form of a cylinder having slots $d^2$ at each side, so that when these slots are in line with the lens $B^2$ the rays of light will pass unobstructed through the shutter onto the mirror E; but should the shutter be turned so as to throw the slots out of line with the lens $B^2$ the ribbon of light will be made thinner or entirely cut off and the amount of light projected diminished or extinguished.

The shutter $D^2$ is connected to an operating-stem $d^3$ in the manner shown, the slots $d^4$ in this extension being of such a width that when the shutter is manipulated it will not obstruct any portion of the ribbon of light issuing from the shutter $D'$, as the shutter $D^2$ only regulates the central portion of the thin ribbon of light. The shutter is mounted in bearings in the box B and has an arm $d^5$ connected to a foot-lever $d^6$ by a rod $d^7$, so that on operating this lever the shutter can be manipulated. The shutters D $D'$ are constructed in somewhat the same manner as the shutter $D^2$, the shutter D having slots $d$ and the shutter $D'$ having slots $d'$, and these shutters are manipulated by a mechanism at the top of the box, which will be described hereinafter. Back of the shutters are arranged the prisms C $C'$, by which the rays of light passing through shutters D and $D'$ are dispersed, producing spectra, one at each side.

F $F'$ are cylindrical convex mirrors so arranged that a part of the rays of one spectrum are caught by the mirror F and a part of the rays of the other spectrum by the mirror $F'$, and these mirrors are adjustable across the spectra, so as to reflect any part of the spectrum, and they are independently mounted, so that each can reflect a certain part, and thus produce any desired combination of spectrum colors.

Referring now to Figs. 3 and 4, I will describe the construction of the device for adjusting the mirrors F $F'$ and for operating the shutters D $D'$. In the top or table $b'$ of the box B are dovetailed grooves $b^2$, to which are adapted slides G, in which are mounted the rods H, having suitable handles $h$. Secured to the under side of each slide is a bracket G', having a bearing for a shaft $f$, carrying the mirror F or F'. On this shaft is an arm $f'$, upon which rests the end $h'$ of the rod H, and on the shaft is also an arm $f^2$, connected to which arm and to a projection $g$ on the bracket G' is a spring $f^3$, having sufficient tension to keep the arm $f^2$ in an elevated position, except when pressure is applied to the rod H, when it will yield sufficiently to allow the mirror to be turned to different degrees, so as to reflect the rays from a downward direction out through the opening $b$. Centered on the bracket G' is a frame $G^2$, in which is a cylindrical convex lens $i$ for the purpose of diverging in the horizontal plane the rays already diverging in the vertical plane by having been reflected by the cylindrical convex mirror F or F'. The outer end of the frame $G^2$ is provided with a roller $g'$, adapted to travel on a rail $G^3$. The rays from different parts of the spectrum strike the cylindrical convex mirror F or F' under different angles, according to their refrangibility. Consequently the rays covering the object to be illuminated are reflected from higher or lower parts of said mirrors. The rail $G^3$ has therefore to be of such a shape as to bring the elevation of the lens $i$ at all times in line with these different parts and said object. Further, the frame $G^2$ has to extend far enough on all sides to obstruct the passage of all rays reflected from the mirror F or F' through opening $b$, except those passing through lens $i$.

Adapted to turn with and slide along the square part $h^2$ of the rod H is a yoke H', connected to a rod K by a universal joint $k$, and on the rod K is an arm $k'$, to the end $k^2$ of which is attached the arm $d^3$ of the shutter D, the same construction being carried out in connection with the shutter D'. The rod K is mounted in a bearing K', pivoted to a bracket $K^2$, mounted on the base A, so that the rod will swing as the slide G is moved in one direction or the other.

It will be seen by the above construction that by moving the slides the mirrors can be shifted over any part of the spectrum, while by pressing down the rod the mirror can be shifted on its axis, so as to reflect the rays in the desired direction, and by turning the rod the shutters can be operated so as to regulate the amount of light reflected. By operating the two slides any combination of spectrum colors can be reflected through the opening $b$, and as the white beam of light is reflected in the same direction as the colored rays it will mingle with the same, the amount of white light being regulated by the shutter $D^2$, as described above.

I claim as my invention—

1. The combination with a lamp or other source of light, of a collimating lens, the lenses for transforming the rays of light into a thin ribbon, a regulating-shutter, a prism and a reflector, substantially as described.

2. The combination of the collimating lens, the cylindrical lenses for transforming the rays into a broad thin ribbon of light, the shutters D, D', $D^2$ arranged substantially as described, with a reflector E and prisms C C', and reflectors E', F and F', substantially as described.

3. The combination of the lens, a regulating-shutter, a prism, a reflector, a slide carrying said reflector and a rod adapted to turn the reflector and operate the shutter, substantially as described.

4. The combination in an apparatus for effecting illumination in colors, of the slide G carrying a rod H, a shaft, a reflector carried thereby and an arm on said shaft acted upon by the rod H so that on moving the slide the reflector will be adjusted, substantially as described.

5. The combination of the slide, the shaft carried thereby, a reflector on said shaft, an arm on the shaft, a rod mounted in the slide and acting upon the arm, a spring, a yoke adapted to run with the rod, a shutter and connections between the shutter and the yoke by which the shutter is operated by the rod, substantially as described.

6. The combination of the slide carrying the reflector, a rod as H, a yoke connected to and adapted to turn with said rod, a rod K connected to said yoke and open at its lower end, an arm $k'$ on said rod, and a shutter having an arm as $d^3$ connected to said arm $k'$, substantially as described.

7. The combination of the lens, a shutter, an arm on said shutter, a connecting-rod and a foot-lever, substantially as described.

8. The combination of the slide, a bracket thereon, a shaft mounted in said bracket, a reflector carried by said shaft, a frame, a lens therein, a rail for supporting the outer end of said frame, and a rod connected to the shaft so as to adjust the reflector, substantially as described.

In testimony whereof I have signed my name to this specification in the presence of two subscribing witnesses.

BALTZAR E. L. DE MARÉ.

Witnesses:
WILL. A. BARR,
JOSEPH H. KLEIN.